(12) United States Patent
Wei et al.

(10) Patent No.: US 11,582,398 B2
(45) Date of Patent: Feb. 14, 2023

(54) CALIBRATING COLOR MEASUREMENT DEVICES

(71) Applicant: DATACOLOR INC., Lawrenceville, NJ (US)

(72) Inventors: Hong Wei, Princeton, NJ (US); Heath Barber, Fuquay Varina, NC (US)

(73) Assignee: DATACOLOR INC., Lawrenceville, NJ (US)

( * ) Notice: Subject to any disclaimer, the term of this patent is extended or adjusted under 35 U.S.C. 154(b) by 143 days.

(21) Appl. No.: 17/146,179

(22) Filed: Jan. 11, 2021

(65) Prior Publication Data
US 2022/0224818 A1 Jul. 14, 2022

(51) Int. Cl.
*H04N 5/235* (2006.01)
*G01J 3/52* (2006.01)
*G06N 3/08* (2006.01)
*G01J 3/50* (2006.01)

(52) U.S. Cl.
CPC ............ *H04N 5/2353* (2013.01); *G01J 3/501* (2013.01); *G01J 3/524* (2013.01); *G06N 3/08* (2013.01); *H04N 5/2354* (2013.01)

(58) Field of Classification Search
CPC ..... H04N 5/2353; H04N 5/2354; G01J 3/501; G01J 3/524; G06N 3/08
See application file for complete search history.

(56) References Cited

U.S. PATENT DOCUMENTS

| | | | |
|---|---|---|---|
| 7,057,641 B2 | 6/2006 | Bodnar et al. | |
| 7,554,586 B1 * | 6/2009 | Imai | H04N 1/215 348/270 |
| 8,279,440 B2 | 10/2012 | Frick et al. | |
| 9,395,292 B2 * | 7/2016 | Wei | G01J 3/0291 |
| 10,346,710 B2 | 7/2019 | Xu | |
| 10,502,628 B1 | 12/2019 | Park et al. | |

(Continued)

OTHER PUBLICATIONS

International Search Report and Written Opinion in corresponding International Patent Application No. PCT/US 2022/012040, dated Apr. 6, 2022.

*Primary Examiner* — Ahmed A Berhan
(74) *Attorney, Agent, or Firm* — Leason Ellis LLP

(57) ABSTRACT

In one or more implementations, the apparatus, systems and methods disclosed herein are directed to calibrating a smart phone with an arbitrary phone case for color lookup applications, wherein the calibration process includes obtaining, with the smartphone without the case equipped, a first measurement data set that includes at least one measurement of each of a black, white and grey calibration target; obtaining, with the smartphone with the case equipped, at least three exposure measurements of a white calibration target at least three different exposure times; calculating an optimized exposure time using at least the at least three exposure measurements; obtaining, with the smartphone with the case equipped, a second measurement data set that includes at least one measurement of each of a black, white and grey calibration target at the optimized exposure time; generating fitting parameters from the first and second measurement datasets; and storing the generated fitting parameters and optimized exposure time in at least one of a local or remote data storage device.

18 Claims, 11 Drawing Sheets

(56) References Cited

U.S. PATENT DOCUMENTS

| | | |
|---|---|---|
| 10,643,099 B2 | 5/2020 | Xu |
| 2015/0009500 A1 | 1/2015 | Wong et al. |
| 2016/0084707 A1 | 3/2016 | Scott et al. |
| 2020/0103284 A1 | 4/2020 | Park et al. |
| 2020/0225778 A1 | 7/2020 | Lewty et al. |
| 2020/0319024 A1 | 10/2020 | Takahashi et al. |

* cited by examiner

CALIBRATING COLOR MEASUREMENT DEVICES

FIELD OF THE DISCLOSURE

The present invention generally relates to the measurement of color, and more specifically relates to color lookup using a smart phone.

BACKGROUND

Many industries, including textiles, coatings, and the like, rely on color matching. Color matching may involve identifying a target color (e.g., from an object or from a known standard) and subsequently reproducing the target color in a color mixture, i.e., so that any visual difference between the color mixture and the target color is minimized. For instance, a customer may ask for a can of paint to be mixed in a color that matches the color of a wall in the customer's home, so that touch-ups to the wall can be made in a manner that "blends in." Similarly, an automobile manufacturer may ask that a coating be mixed in a color that matches the color of existing automobiles built by the manufacturer, in order to ensure color consistency across the manufacturer's line.

There exists in the field of color management and matching, a number of approaches to identifying the color of a sample and matching that identified color to a standardized set of colors, such as a color supplier's product offerings. For example, U.S. Pat. No. 7,057,641 B2 'Method for Using an Electronic Imaging Device to Measure Color'; U.S. Pat. No. 7,554,586 B1 'System and Method for Scene Image Acquisition and Spectral Estimation Using a Wide-Band Multi-Channel Image Capture'; U.S. Pat. No. 8,279,440 B2 "Hand-Held Light Measuring Device"; U.S. Pat. No. 10,057,549 "Computer-implemented system and method for color sensing, storage and comparison"; US 2020/0225778 A1 "Computer System with Color sampling Stylus"; U.S. Pat. No. 10,502,628 B1 "Inter-Instrument Variation Correction"; U.S. Pat. No. 10,346,710 "Multi-Agent Training of a Color Identification Neural Network"; and U.S. Pat. No. 10,643,099 "Multi-Agent Training of a Color Identification Neural Network", all of which are incorporated by reference as if presented herein in their respective entireties. Likewise, there exists commercial products that permit users to sample colors, and then match those colors to a given color supplier's product offerings, for example, Nix color sensor https://www.nixsensor.com/; Variable Color Muse https://colormuse.io/; Datacolor ColorReader http://www.colorreader.datacolor.com/us/; X-Rite ColorEye https://www.xrite.com/categories/color-matching-apps/coloreye each provide apparatus and systems for evaluating color from color samples and then matching those colors to a pre-defined color set.

While some approaches currently use neural networks or other machine learning approaches to improve the performance of the color matching approach, the present state of the art still suffers from a number of drawbacks. The current approaches require in-depth training data sets to obtain suitably robust ANN models in order to provide accurate color measurement results.

SUMMARY

In one or more implementations, the apparatus, systems and methods disclosed herein are directed to configuring This invention discloses a method to calibrate the smart phone with an arbitrary phone case for color lookup applications using one to three calibration color patches. A two steps calibration approach is proposed to match the raw count of a color measurement from a smart phone with a phone case to the raw count of a color measurement of the same sample from the same smart phone without a phone case. The first step adjusted the exposure time of the camera while the second step further fine tune the raw counts via linear or higher order fitting. A simplified workflow is also proposed to conduct this two-step calibration. This method avoids a full color calibration using hundreds to thousands of calibration colors.

In one or more implementations, the apparatus, systems and methods disclosed herein are directed to calibrating a smart phone with an arbitrary phone case for color lookup applications, wherein the calibration process includes obtaining, with the smartphone without the case equipped, a first measurement data set that includes at least one measurement of each of a black, white and grey calibration target; obtaining, with the smartphone with the case equipped, at least three exposure measurements of a white calibration target at least three different exposure times; calculating an optimized exposure time using the measurement of white calibration target with the phone without the phone case equipped and at least the three exposure measurements of the white calibration target with the phone with the phone case equipped; obtaining, with the smartphone with the case equipped, a second measurement data set that includes at least one measurement of each of a black, white and grey calibration target at the optimized exposure time; generating fitting parameters from the first and second measurement datasets; and storing the generated fitting parameters and optimized exposure time in at least one of a local or remote data storage device.

A system is described herein for obtaining color measurements of a sample, the system including a color measurement device and a processor is configured by code executing therein. In one implementation, the processor is configured by code executing therein to receive, from the color measurement device provided within an encasement, one or more color measurements of a sample obtained using a pre-determined exposure time. The processor is further configured by code to access one or more adjustment factors from a data storage location, wherein the adjustment factor is derived, in part, from measurements made using the same make of color measurement device as the color measurement device without being equipped with a case. The processor is further configured to adjust the one or more color measurements of the sample using the adjustment factors to obtain adjusted measurement data. The processor configured by code executing therein to transform the adjusted measurement data to color space data. In a further implementation, the color space data is in the L*, a*, b* color space.

A process is described herein for obtaining calibration factors for a color measurement device equipped with a removable encasement, the process comprising obtaining, with the color measurement device without the removable encasement, at least one non-encasement color measurement of at least one color measurement target at a first exposure time. The process further includes obtaining, using the color measurement device equipped with the removable encasement, a plurality of encasement-equipped color measurements of the at least one color measurement target, wherein at least a portion of the plurality of color measurements is obtained at an exposure time less than the first exposure time. The process includes deriving, using at least the plurality of color measurements, a derived exposure time value and obtaining, using non-linear polynomial fitting, a set of fitting parameters to adjust the encasement-equipped color measurements to match the non-encasement color measurement of the same color measurement target. The process further includes storing the fitting parameters and the derived exposure time in an accessible storage location.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF CERTAIN EMBODIMENTS OF THE INVENTION

Figure 1:
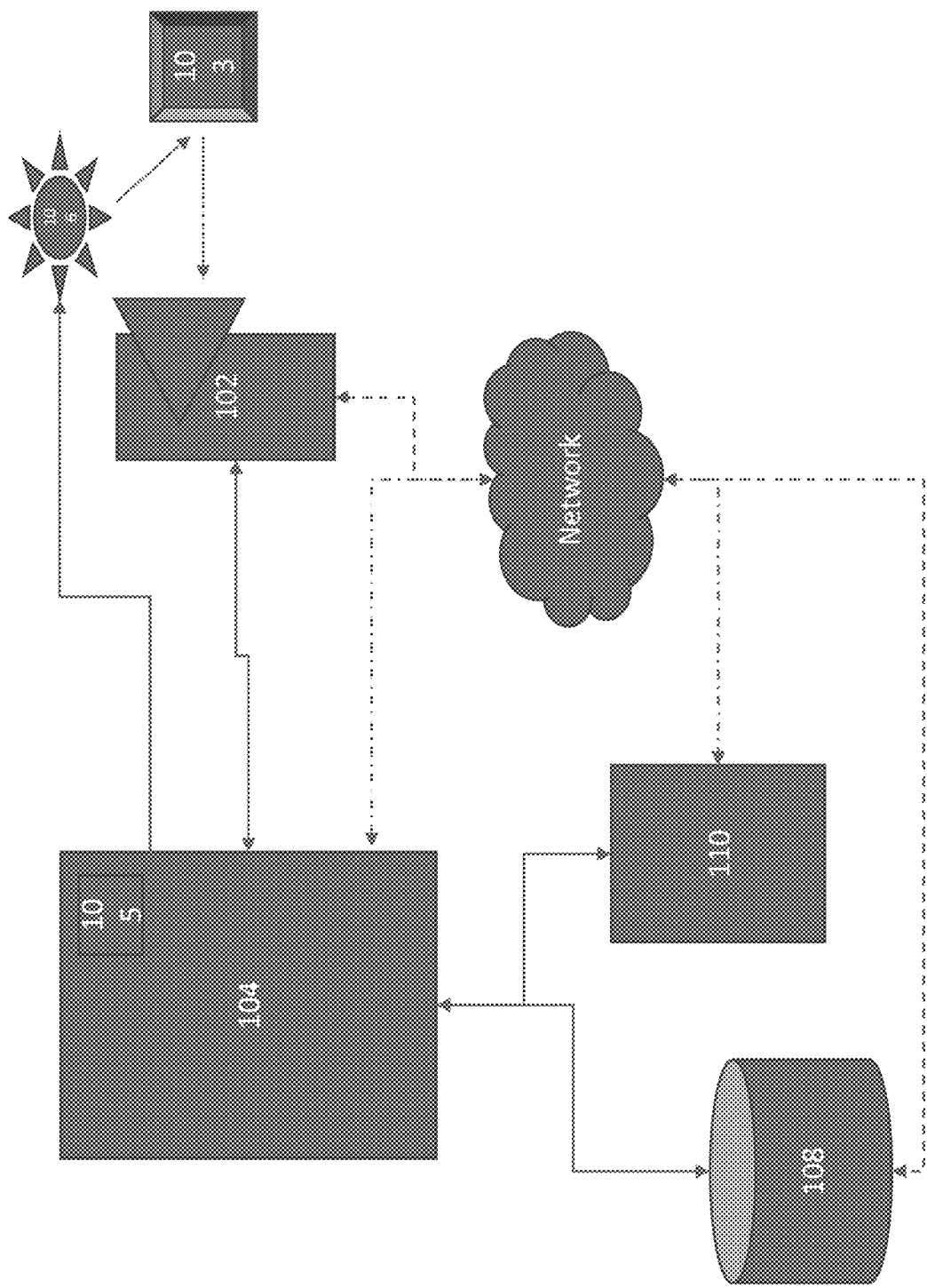
FIG. 1 provides the devices and components of a color measurement system that interface over one or more data communication networks in accordance with one or more implementations of the present application.

By way of overview and introduction, the apparatus, systems and methods described are directed to capturing color measurements using a calibrated measurement device equipped with a device encasement.

As disclosed in pending U.S. patent application Ser. No. 16/591,088, the inventors have developed a novel method of color lookup using a smart phone, or other type of mobile computing device that includes an integrated or associated camera. As disclosed therein, a mobile device can be calibrated and controlled to use both a rear facing camera and its associated flash to conduct accurate and consistent color measurement without additional hardware. However, it will be appreciated that during the factory calibration, each portable computing device can be given a given a set of calibration parameters that would convert the raw counts of a measurement made by the camera of the portable computing device to color values such as L*a*b*.

The calibration of color measurement devices typically requires tens to thousands of calibration colors with tightly controlled measurement conditions. For example, a complete color calibration of an image capture device (such as a smartphone) includes obtaining measurement of thousands of colors using a few, randomly selected, devices having the same make and model. This small group of randomly selected devices serves as a master or control device for this make and model. Such an approach is described more fully in U.S. Pat. No. 10,502,628, herein incorporated by reference in its entirety. Similarly, individual units of the same make or model of image-based color measurement device can be calibrated by aligning the measurements taken by such a device with the same measurement obtained using the master or control device.

As described in more detail herein, such calibration processes can be impacted when cases, such as a phone case, are equipped to the measurement device. Furthermore, in order to properly calibrate a device using the master or control device, the measurement conditions, such as the tilting angle and the distance between the camera and color target, need to be close to those conditions present during the original calibration. However, maintaining a consistent distance between the camera of the color measurement device (such as a smartphone) and the color target is almost impossible due to variations in the physical configuration of the mobile computing device. For example, a user may add a phone case from one or a plurality of different manufacturers or suppliers. These phone cases change the relative thickness of the phone, such that the distance between the camera and the color targets will not be uniform across different users of different cases.

It is understood that variation in the distance between camera and the color target will result in changes the raw counts of the measurement and therefore, changes the color measurement results L*a*b*. Such variation can be caused by using different cases of different thicknesses. Thus, it becomes impractical to provide a calibration process that asks each individual user to perform a full calibration, using tens to thousands of calibration colors, as it was done in the factory every time a device cover, case or shell is changed.

The foregoing disclosure provides that the calibration of these case equipped devices only need use a few colors (such as white, gray, black) to bring the measurement of the device equipped with a case closer to the measurement of the same device without a case.

As provided in more detail herein, the systems, apparatus, and computer implemented processes described overcome these drawbacks by providing a two-step device case calibration. The provided approach utilizes a small number of calibration colors (such as between one and three). Using the described approach, the color measurements (raw counts) of color target made by a device equipped with a case can be matched to the measurements of the same color targets by a device that is not equipped with a case. Using this color matching process, the calibration parameters obtained in the factory setting for the device without the case can be utilized by the color measurement process to obtain the desired color space values. Such as process only needs to be done once and all the raw counts adjusting settings are saved in the software or the cloud for all the future measurements with the mobile capture device when it is equipped with a case.

Referring now to the drawings, in which like references numerals refer to like elements, FIG. 1 illustrates devices and components for obtaining color measurement data that interface over one or more data communication networks in accordance with one or more implementations of the present application. As shown, FIG. 1 illustrates a sample 103 under analysis by color measurement device 102, or sensor thereof. Here, the sample 103 can be any type or form of physical article having color or spectral properties in need of analysis. In one implementation, the sample 103 is sample of a material under production having reflective or transmissive properties. For instance, the sample 103 is a fabric sample, such as fleece or fabric blends. In another implementation, the sample 103 is a sheet of translucent or semi-translucent material. In yet a further implementation, the sample 103 is an object or item integral to a larger structure or item, such as a dashboard of an automobile, or a section of wall of a structure. For example, the sample 103 is a section or portion of stucco, carpe, building materials, housing, chassis, packaging, or another item.

With continued reference to FIG. 1, the color sample 103 is placed such that the color sample 103 can be illuminated by at least one (1) illuminant 106. For instance, the illuminant 106 is configurable to produce a light with certain spectral power distributions. For instance, the illuminant 106 includes one or more discrete light emitting elements, such as LEDs, OLEDs, fluorescent, halogen, xenon, neon, D65 light, fluorescent lamp, mercury lamp, Metal Halide lamp, HPS lamp, incandescent lamp or other commonly known or understood lighting sources. In one arrangement, illuminant 106 is a broad-band LED. In one or more implementations, the illuminant 106 includes a lens, filter, screen, enclosure, or other elements (not shown) that are utilized in combination with the light source of the illuminant 106 to direct a beam of illumination, at a given wavelengths, to the sample 103.

In one implementation, the illuminant 106 is operable or configurable by an internal processor or other control circuit. Alternatively, the illuminant 106 is operable or configurable by a remote processor or control device having one or more linkages or connections to the illuminant 106. As shown in FIG. 1, the illuminant 106 are directly connected to a color measurement device 102.

As further shown in FIG. 1, the illuminant 106 is positioned relative to the sample 103 and color measurement device 102 so as to provide a 45/0, d/8, or other illumination/pickup geometry combination. Where the sample 103 is a transmissive sample, however, the orientation of the illuminant 106 relative to the sample 103 and the color measurement device 102 is such that the light beam is directed though the sample 103 to the color measurement device 102.

Continuing with FIG. 1, light reflected (or in the case of a transmissive sample, transmitted) upon the sample 103 is captured or measured by a color measurement device 102. Here, the color measurement device 102 can be a color sensor or image capture device. For example, the color measurement device 102 is a scientific CMOS (Complementary Metal Oxide Semiconductor), CCD (charge coupled device), colorimeter, spectrometer, spectrophotometer, photodiode array, or other light sensing device and any associated hardware, firmware and software necessary for the operation thereof.

In a particular implementation, the color measurement device 102 is configured to generate an output signal upon light being striking the color measurement device 102 or a light sensing portion thereof. By way of non-limiting example, the color measurement device 102 is configured to output a signal in response to light that has been reflected off of the sample striking a light sensor or other sensor element integral or associated with the color measurement device 102. For instance, the color measurement device 102 is configured to generate a digital or analog signal that corresponds to the wavelength or wavelengths of light that a light sensor integral to the color measurement device 102 after being reflected off of the sample 103. In one or more configurations, the color measurement device 102 is configured to output spectral information, RGB information, or another form of multi-wavelength data representative of light reflected off, or transmitted through, the sample 103.

In one or more implementations, the color measurement device 102 the camera component of a smartphone, tablet or other portable communication device. Alternatively, the color measurement device 102 is a standalone color measurement device that is configured to output data to one or more remote processors or computers.

In one non-limiting implementation, the color measurement device 102 is a camera or image recording device integrated into a smartphone, tablet, cell phone, or other portable computing apparatus. In a further embodiment, the color measurement device 102 is an "off the shelf" digital camera or web-camera connected or in communication with one or more computing devices.

The color measurement device 102, in accordance with one embodiment, is a stand-alone device capable of storing local data corresponding to measurements made of the sample 103 within an integrated or removable memory. In an alternative implementation, the color measurement device 102 is configured to transmit one or more measurements to a remote storage device or processing platform, such as processor 104. In configurations calling for remote storage of image data, the color measurement device 102 is equipped or configured with network interfaces or protocols usable to communicate over a network, such as the internet.

Alternatively, the color measurement device 102 is connected to one or more computers or processors, such as processor 104, using standard interfaces such as USB, FIREWIRE, Wi-Fi, Bluetooth, and other wired or wireless communication technologies suitable for the transmission measurement data.

The output signal generated by the color measurement device 102 is transmitted to one or more processor(s) 104 for evaluation as a function of one or more hardware or software modules. As used herein, the term "module" refers, generally, to one or more discrete components that contribute to the effectiveness of the presently described systems, methods and approaches. Modules can include software elements, including but not limited to functions, algorithms, classes and the like. In one arrangement, the software modules are stored as software in the memory 205 of the processor 104. Modules also include hardware elements substantially as described below. In one implementation, the processor 104 is located within the same device as the color measurement device 102. However, in another implementation, the processor 104 is remote or separate from the color measurement device 102.

In one configuration, the processor 104 is configured through one or more software modules to generate, calculate, process, output or otherwise manipulate the output signal generated by the color measurement device 102.

In one implementation, the processor 104 is a commercially available computing device. For example, the processor 104 may be a collection of computers, servers, processors, cloud-based computing elements, micro-computing elements, computer-on-chip(s), home entertainment consoles, media players, set-top boxes, prototyping devices or "hobby" computing elements.

Furthermore, the processor 104 can comprise a single processor, multiple discrete processors, a multi-core processor, or other type of processor(s) known to those of skill in the art, depending on the particular embodiment. In a particular example, the processor 104 executes software code on the hardware of a custom or commercially available cellphone, smartphone, notebook, workstation or desktop computer configured to receive data or measurements captured by the color measurement device 102 either directly, or through a communication linkage.

The processor 104 is configured to execute a commercially available or custom operating system, e.g., MICROSOFT WINDOWS, APPLE OSX, UNIX or Linux based operating system in order to carry out instructions or code.

In one or more implementations, the processor 104 is further configured to access various peripheral devices and network interfaces. For instance, the processor 104 is configured to communicate over the internet with one or more remote servers, computers, peripherals or other hardware using standard or custom communication protocols and settings (e.g., TCP/IP, etc.).

The processor 104 may include one or more memory storage devices (memories). The memory is a persistent or non-persistent storage device (such as an IC memory element) that is operative to store the operating system in addition to one or more software modules. In accordance with one or more embodiments, the memory comprises one or more volatile and non-volatile memories, such as Read Only Memory ("ROM"), Random Access Memory ("RAM"), Electrically Erasable Programmable Read-Only Memory ("EEPROM"), Phase Change Memory ("PCM"), Single In-line Memory ("SIMM"), Dual In-line Memory ("DIMM") or other memory types. Such memories can be fixed or removable, as is known to those of ordinary skill in the art, such as through the use of removable media cards or modules. In one or more embodiments, the memory of the processor 104 provides for the storage of application program and data files. One or more memories provide program code that the processor 104 reads and executes upon receipt of a start, or initiation signal.

The computer memories may also comprise secondary computer memory, such as magnetic or optical disk drives or flash memory, that provide long term storage of data in a manner similar to a persistent memory device. In one or more embodiments, the memory of the processor 104 provides for storage of an application program and data files when needed.

The processor 104 is configured to store data either locally in one or more memory devices. Alternatively, the processor 104 is configured to store data, such as measurement data or processing results, in a local or remotely accessible database 108. The physical structure of the database 108 may be embodied as solid-state memory (e.g., ROM), hard disk drive systems, RAID, disk arrays, storage area networks ("SAN"), network attached storage ("NAS") and/or any other suitable system for storing computer data. In addition, the database 108 may comprise caches, including database caches and/or web caches. Programmatically, the database 108 may comprise flat-file data store, a relational database, an object-oriented database, a hybrid relational-object database, a key-value data store such as HADOOP or MONGODB, in addition to other systems for the structure and retrieval of data that are well known to those of skill in the art. The database 108 includes the necessary hardware and software to enable the processor 104 to retrieve and store data within the database 108.

In one implementation, each element provided in FIG. 1 is configured to communicate with one another through one or more direct connections, such as through a common bus. Alternatively, each element is configured to communicate with the others through network connections or interfaces, such as a local area network LAN or data cable connection. In an alternative implementation, the color measurement device 102, processor 104, and database 108 are each connected to a network, such as the internet, and are configured to communicate and exchange data using commonly known and understood communication protocols.

In a particular implementation, the processor 104 is a computer, workstation, thin client or portable computing device such as an Apple iPad/iPhone® or Android® device or other commercially available mobile electronic device configured to receive and output data to or from database 108 and or color measurement device 102.

In one arrangement, the processor 104 communicates with a local or remote display device 110 to transmit, displaying or exchange data. In one arrangement, the display device 110 and processor 104 are incorporated into a single form factor, such as a color measurement device that includes an integrated display device. In an alternative configuration, the display device is a remote computing platform such as a smartphone or computer that is configured with software to receive data generated and accessed by the processor 104. For example, the processor is configured to send and receive data and instructions from a processor(s) of a remote computing device. This remote computing device 110 includes one or more display devices configured to display data obtained from the processor 104. Furthermore, the display device 110 is also configured to send instructions to the processor 104. For example, where the processor 104 and the display device are wirelessly linked using a wireless protocol, instructions can be entered into the display device that are executed by the processor. The display device 110 includes one or more associated input devices and/or hardware (not shown) that allow a user to access information, and to send commands and/or instructions to the processor 104 and the color measurement device 102. In one or more implementations, the display device 110 can include a screen, monitor, display, LED, LCD or OLED panel, augmented or virtual reality interface or an electronic ink-based display device.

Those possessing an ordinary level of skill in the requisite art will appreciate that additional features, such as power supplies, power sources, power management circuitry, control interfaces, relays, adaptors, and/or other elements used to supply power and interconnect electronic components and control activations are appreciated and understood to be incorporated.

Figure 2:
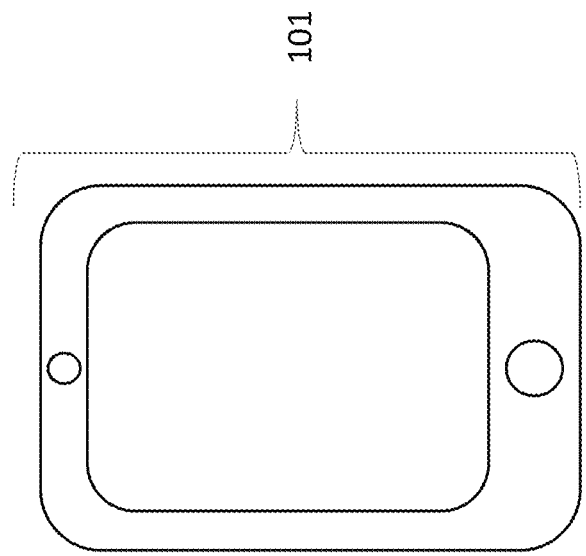
FIG. 2 illustrates the color measurement device equipped with a case and without a case equipped.
Figure 2:
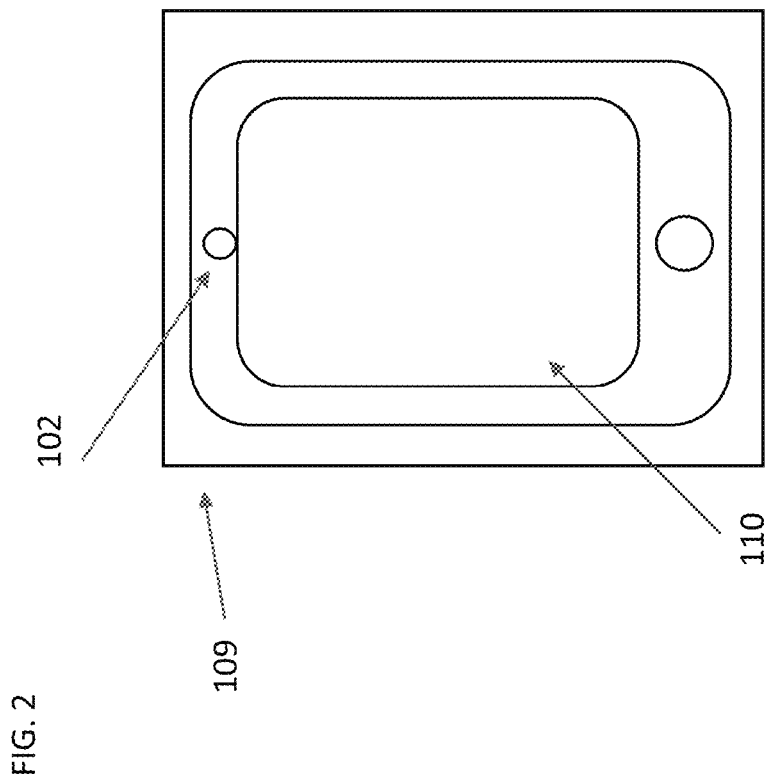

As shown in FIG. 2, the processor 104 and color measurement device 102 and display device 110 and be integrated into a single device or measurement platform 101. As further shown, the measurement platform 101 can be further equipped with an case 109. Such an encasement can alter the dimensions of the measurement platform such that the distance between the measurement platform 101 and a target with the case 109 equipped is greater than the same distance where the case 109 is not equipped.

As noted, the difference in distance between a target and a measurement platform 101 without the case equipped and with the case equipped with results in different measurements obtained by the color measurement device 102 for the same color target.

Figure 3:
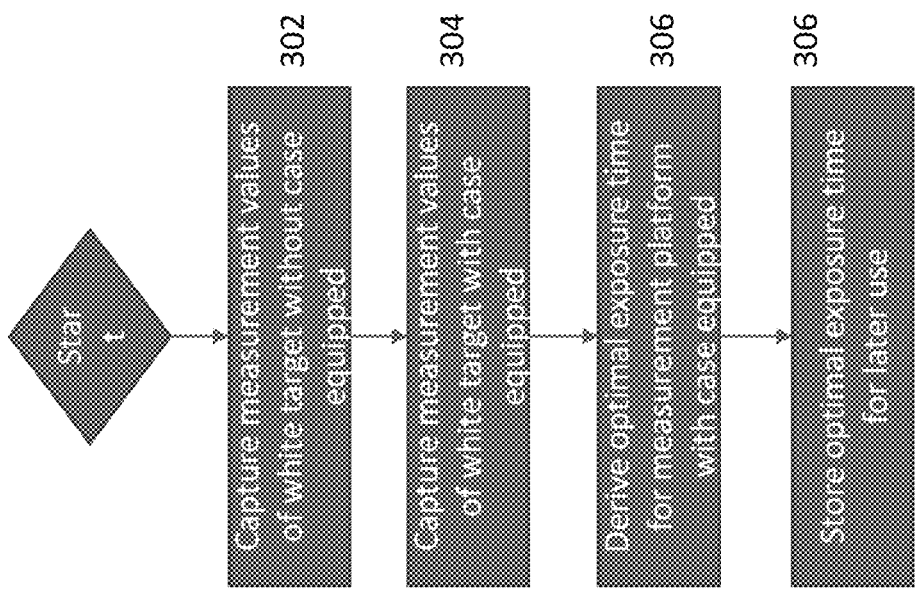
FIG. 3 provides a flow diagram detailing the color measurement system according to one implementation described.
Figure 4:
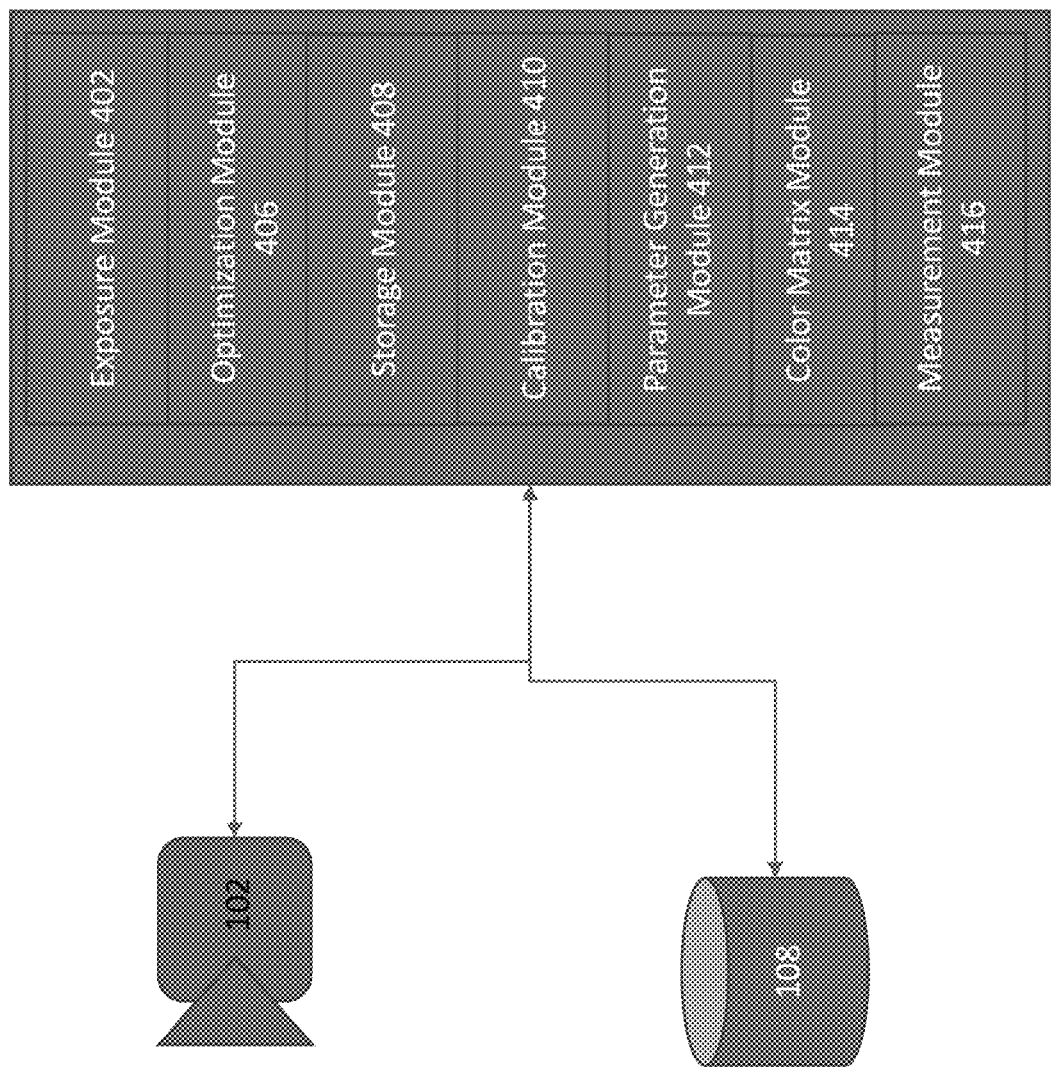
FIG. 4 provides a module diagram of the color measurement system according to one implementation described.

Turning now to the flow diagram of FIG. 3 and module diagram of FIG. 4, a process for adjusting the camera exposure time to correct for this difference is provided. By way of illustration only, the foregoing examples will describe the use of a smartphone or other mobile computing device to obtain color measurement. However, alternative configurations or devices that are capable of obtaining color measurements are also understood and envisioned.

As shown in step 302, the measurement platform 101 (such as a smartphone) is used to measure a color target. For example, an exposure module 402 configures a processor 104 of the measurement platform 101 to obtain a color measurement of a white color patch, such as the white target patch shown in FIG. 9(*a*). For example, and in no way limiting, a smartphone is provided on a flat surface having the desired color target. Here, the smartphone does not include a case or cover 109. The processor 104 is configured by the exposure module 402 to capture a color measurement using a pre-defined exposure time. It will be appreciated that the orientation of the smartphone when obtaining this measurement is similar to the tilting angle used to obtain the calibration parameters in the factory calibration process.

In one or more implementations, the exposure module 402 configures the processor 104 to record the raw counts from this measurement as $D^P$, where the superscript "P" represents that the measurement is done with the using a smartphone that was not equipped with a case or cover.

In one embodiment, $D^P$ can be written as a vector as shown in Eq. 1, where the subscript R/G/B indicates the red, green, and blue channels from the camera of the computing device or smartphone. Here, pre-defined camera exposure time that is associated with the bare phone is referred to as $T^P$.

$$D^P = \begin{bmatrix} d_R^P \\ D_G^P \\ D_B^P \end{bmatrix} \quad \text{Eq. 1}$$

As shown in step 304, a case 109 is secured to the smartphone. Next, the exposure module 402 configures the processor 104 of the smartphone to measure the same white color patch as measured in step 302. Because more light will be collected by the color measurement device 102 when the case 109 is equipped, the exposure time needs to be reduced to more accurately match the raw measurements obtained when the smartphone does not have a case equipped.

In one particular implementation, the exposure module 402 configures the processor 104 of the measurement platform 101 to measure the same white color patch but at different exposure times than $T^P$. For example, the exposure module 402 configures the processor 104 to measure the white tile three (3) times at the same tilting angle but with three (3) different camera exposure times. In one non-limiting implementation, the different exposure times are provided at half, quarter, and one eighth of the pre-defined exposure time $T^P$.

The exposure module 402 further configures the processor 104 to store the measurements made in step 304 to a data storage device. For example, the three (3) measurements obtained at different exposure times are stored as shown in Eq. 2, where the superscript C indicates the measurement with the case 109, and the superscript 2, 4, 8 indicate the exposure time at half, quarter, and one eighth of the exposure time $T^P$.

$$D^{C2} = \begin{bmatrix} d_R^{C2} \\ D_G^{C2} \\ D_B^{C2} \end{bmatrix}, D^{C4} = \begin{bmatrix} d_R^{C4} \\ D_G^{C4} \\ D_B^{C4} \end{bmatrix}, D^{C8} = \begin{bmatrix} d_R^{C8} \\ D_G^{C8} \\ D_B^{C8} \end{bmatrix} \quad \text{Eq. 2}$$

In a further implementation of the process described, the measurements obtained in step 304 are used to generate an optimal or optimized exposure time value $T^C$ as shown in step 306. For instance, a processor 104 is configured by an optimization module 406 to calculate an optimal exposure time using one or more optimization functions. The optimization module 406 includes one or more submodules that configure the processor 104 to use the measurement obtained in step 304 in a linear fitting calculation. Here, such a linear fitting submodule configures the processor to determine the optimum exposure time for a measurement. For instance, the optimization module 406 configures the processor 104 to derive an exposure time for the measurement captured by a measurement platform 101 with a case 109 equipped that will result in the same measurement of raw counts as the same device without a device case. By way of further example, the optimization module 406 is configured to determine an exposure time for a device equipped with a case to obtain measurements as close to $D^P$ (raw counts without the device case) as possible.

In a further configuration, the optimization module 406 configures the processor 104 to derive an optimized exposure time $T^C$ value using only a portion of the measurements obtained in step 304. As shown in step 306, the optimization module 406 configures the processor 104 to determine that the measurements obtained using half time exposure ($D^{C2}$) are not saturated. In this instance, the optimization module 406 configures the processor 104 to obtain an optimum exposure time according to Eq 3. Here, the function 'mean' in the equation is to average the three exposure times calculated from each R, G, or B channel.

$$T^C = \text{mean}\left(\frac{T^P}{4} \frac{D^P + D^{C2} - 2D^{C4}}{D^{C2} - D^{C4}}\right) \quad \text{Eq. 3}$$

For example, where it is determined that $D^{C2}$ is saturated, then the raw counts $D^{C4}$ and $D^{C8}$ will be used for the calculation as shown in Eq. 4.

$$T^C = \text{mean}\left(\frac{T^P}{4} \frac{D^P + D^{C4} - 2D^{C8}}{D^{C4} - D^{C8}}\right) \quad \text{Eq. 4}$$

The calculated exposure time with the measurement platform 101 case 109 equipped ($T^C$) is then saved for further use in the measurement process. For example, as shown in step 308, a storage module 408 configures the processor 104 of the measurement platform 101 to store the value for $T^C$ in one or more remote data storage devices. In one implementation, the processor 104 is configured by the storage module 408 to access a local or remote data storage device and store the values obtained in steps 304-306 in an accessible storage location.

Using the value for $T^C$ the processor 104 can be configured to implement a calibration process so as to match the measurements taken with a device equipped with a case to the measurement obtained by the same device obtained without a case 109.

Figure 5:
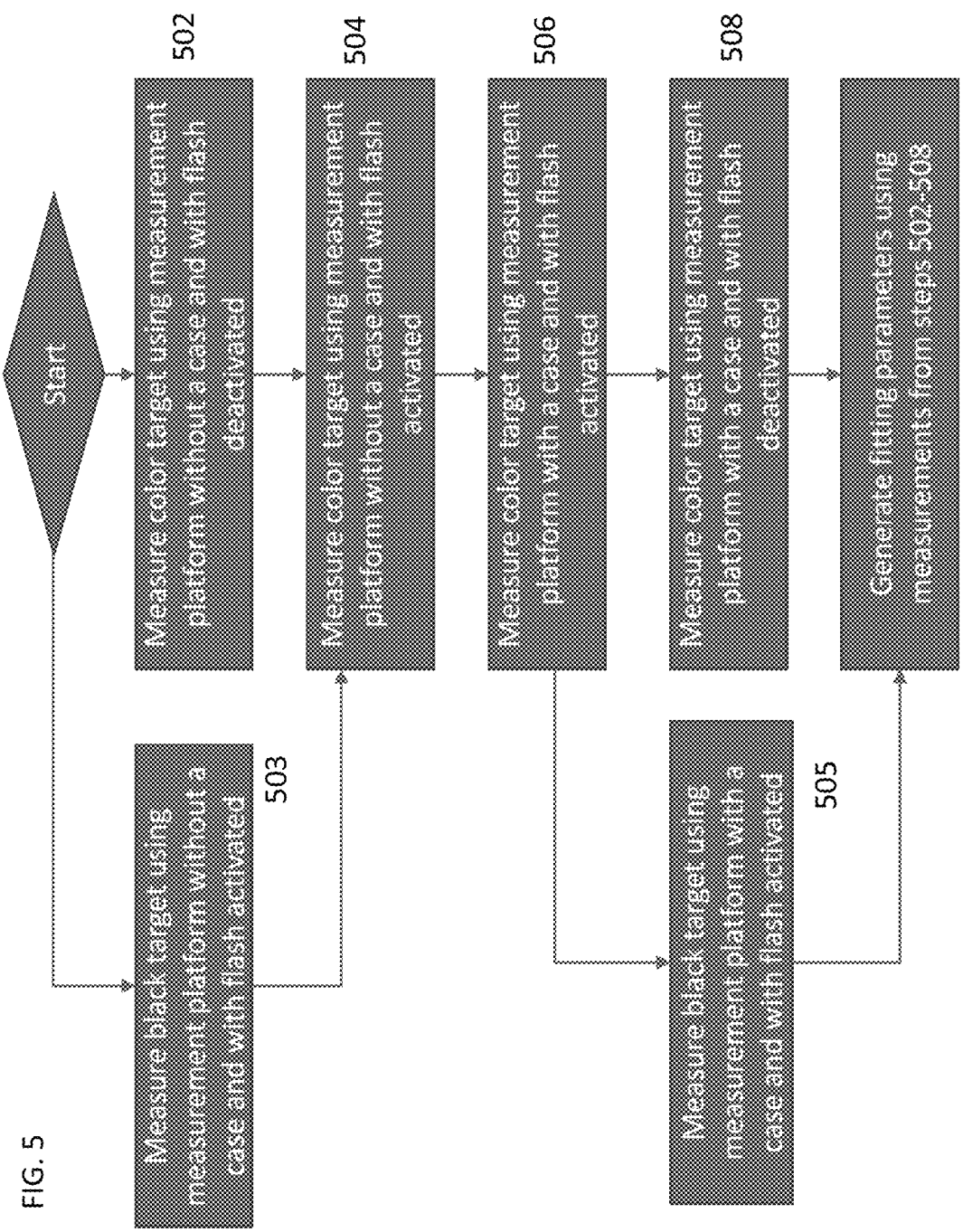
FIG. 5 is a flow diagram detailing the color measurement system according to one implementation described.

Turning now to FIG. 5, once the optimized exposure time is obtained, a calibration process can be used to obtain fitting parameters to adjust the color measurements made by a measurement platform 101 with a case 109 to match the measurements made by a measurement platform 101 that does not have a case 109 equipped.

In one particular implementation, the process of calibrating the measurement device includes one or more measurements of one or more neutral colors with the measurement device without the case equipped at the exposure time of $T^P$ and one or more measurement of the measurement device with the case equipped at exposure time of $T^C$. In one particular implementation, the measurement platform 101 equipped with a case 109 is used to obtain raw measurements of one or more color patches. In a further implementation, the processor 104 of the measurement platform 101 is configured by a calibration module 410 to carry out a calibration process using linear or higher order polynomial fitting.

By way of further explanation, the measurement platform 101 without a case 109 will obtain certain raw counts of a given color target. Here, such measurements can be defined as $D^P = \{D_1^P, D_2^P, \ldots, D_n^P\}$, where n is the number of the neutral colors. Each $D_{x \in \{1,n\}}^P$ is a vector with 3 elements representing the raw counts from Red, Green, and Blue channels. For example, the raw measurements made by the measurement platform 101 without a case equipped of the first color patch can be written as:

$$D_1^P = \begin{bmatrix} d_{1,R}^P \\ d_{1,G}^P \\ d_{1,B}^P \end{bmatrix}$$

Similarly, measurements of the same sample, obtained by the measurement platform 101 with the case 109 equipped, using the derived exposure time, can be defined as $D^C = \{D_2^C, D_2^C, \ldots, D_n^C\}$, where n is the number of the neutral colors. Each $D_{x \in \{1,n\}}^C$ is a vector with 3 elements representing the raw counts from Red, Green, and Blue channels. For example, the raw counts of a first color patch obtained with a measurement platform 101 having the case 109 equipped can be written as:

$$D_1^C = \begin{bmatrix} d_{1,R}^C \\ d_{1,G}^C \\ d_{1,B}^C \end{bmatrix}$$

In one or more particular implementations, where the first color patch ($D_1^P$ and $D_1^C$) measured by the measurement platform 101 is a white color patch that was used for optimizing the exposure time as discussed in steps 302-308, $D_1^P$ will be equal to $D_1^C$. However, it will be appreciated that in some circumstances, $D_1^P = D_1^C$ will not guarantee that the raw counts of the other colors used in the calibration process will be matched as well.

Figure 10:
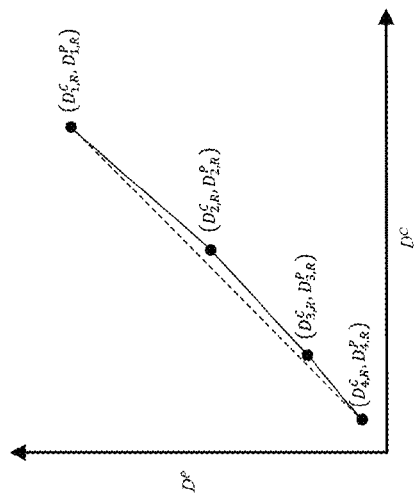
FIG. 10 is a graph detailing the results of certain aspects of the color measurement system according to one implementation described.

For example, as shown in FIG. 10, a set of the raw counts of Red channel from four color patches, obtained by a measurement platform 101 with and without the case equipped are plotted. As can be seen, these four points do not fall on a straight line, indicating that $d_{2,R}^P \neq d_{2,R}^C$, $d_{3,R}^P \neq d_{3,R}^C$ and $d_{4,R}^P \neq d_{4,R}^C$ even when $d_{1,R}^P = d_{1,R}^C$.

Thus, in order to match the raw counts of any color measurements, the processor 104 of the measurement platform 101 is configured by the calibration module 410 to implement a non-linear polynomial fitting process. Here, such a process is configured to close the gap between these two data sets.

In one particular implementation, as shown in FIG. 5, a parameter generation process is used to generate the parameters to be used in the fitting process to align the measurements made by a measurement platform 101 with the case equipped to those measurements made by the measurement platform 101 without a case equipped.

By way of non-limiting example, a parameter generation module 412 configures the processor 104 of the measurement platform 101 carry out a series of measurements to derive or set the fitting parameters (k) that will be used to adjust $D^C$ to match to $D^P$.

In one particular implementation, the parameter generation process includes a measurement step 502. As shown in step 502, the measurement platform 101, without a case, is used to measure the same white color patch (as shown in FIG. 9(a)) used to calculate the optimal exposure time as provided in steps 302-308 without illuminant or a flash. Next, as shown in step 504, the measurement platform 101 measures the white color patch using a flash or other illuminant. Here, the raw counts from measurement step 502 and 504 are referred to as $D_1^P$ and $D_2^P$ respectively. Both $D_1^P$ and $D_2^P$ are vectors containing three elements for RGB channels.

Similarly, the parameter generation process of FIG. 5 includes capturing two measurements on the same white color patch with the measurement platform 101 equipped with the case 109. A first measurement as shown in step 506, is used with the accompanying flash or illuminant of the measurement platform 101. A second measurement is obtained, as in step 508, with the flash deactivated. Here, the raw counts from these two measurements are defined as $D_1^C$ and $D_2^C$ respectively. As with steps 502-504, the measurements made in step 506-508 ($D_1^C$ and $D_2^C$) are vectors containing three elements for RGB channels.

Turning now to step 510, the processor of the measurement platform 101 is configured by the parameter generation module 412 to generate the fitting parameters using the values $D_1^P$, $D_2^P$, $D_1^C$, and $D_2^C$. Those possessing an ordinary level of skill in the requisite art will appreciate that there are multiple ways to generate the fitting parameters (k1, k2) from $D_1^P$, $D_2^P$, $D_1^C$, and $D_2^C$. For example, the parameter generation module 412 configures the processor 104 of the measurement platform 101 so that, for arbitrary raw counts obtained by the measurement platform 101 with the case equipped, $$D^C = \begin{bmatrix} d_R^C \\ d_G^C \\ d_B^C \end{bmatrix},$$

it can be adjusted as $$\begin{cases} d_{\hat{R}}^C = k1_R \times d_R^C + k2_R \\ d_{\hat{G}}^C = k1_G \times d_G^C + k2_G \\ d_{\hat{B}}^C = k1_B \times d_B^C + k2_B \end{cases} \quad \text{Eq. 5}$$

Where, $$k1 = \begin{bmatrix} k1_R \\ k1_G \\ k1_B \end{bmatrix} \text{ and } k2 = \begin{bmatrix} k2_R \\ k2_G \\ k2_B \end{bmatrix}$$

are fitting parameters and $$D^{\hat{C}} = \begin{bmatrix} d_R^{\hat{C}} \\ d_G^{\hat{C}} \\ d_B^{\hat{C}} \end{bmatrix}$$

are adjusted raw counts with the case 109 that would match to the raw count $D^P$ obtained with the measurement platform 101 without a case equipped.

Figure 9:
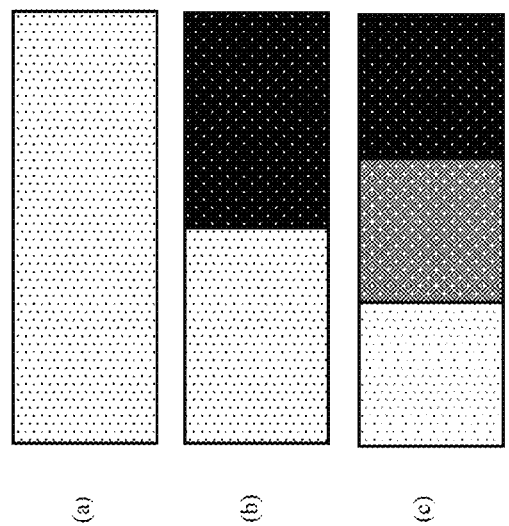
FIG. 9 illustrates color calibration targets used in the color measurement system according to one implementation described.

In an alternative implementation of the parameter generating process, the measurement of the white color patch with the measurement platform 101 flash off can be replaced with a black color patch with the flash activated. Thus, the measurement platform 101 is configured in step 503 to measure a black target without the case equipped. Likewise, the measurement platform 101 is configured to measure the same black target with the case equipped in step 505. In these implementations, two color patches (as shown in FIG. 9(*b*)) are used to obtain the necessary measurement data. Using the data from the white and black patch measurements, the vectors can be used to calculate the fitting parameters using Eq. 5 by substituting the measurements obtained in steps 502 and 508 with the values obtained in steps 503 and 505 respectively. While the approach used in steps 502-508 produce accurate results, it has been found that the introduction of steps 503 and 505 provide an improved match between $D^P$ and $D^C$.

Figure 6:
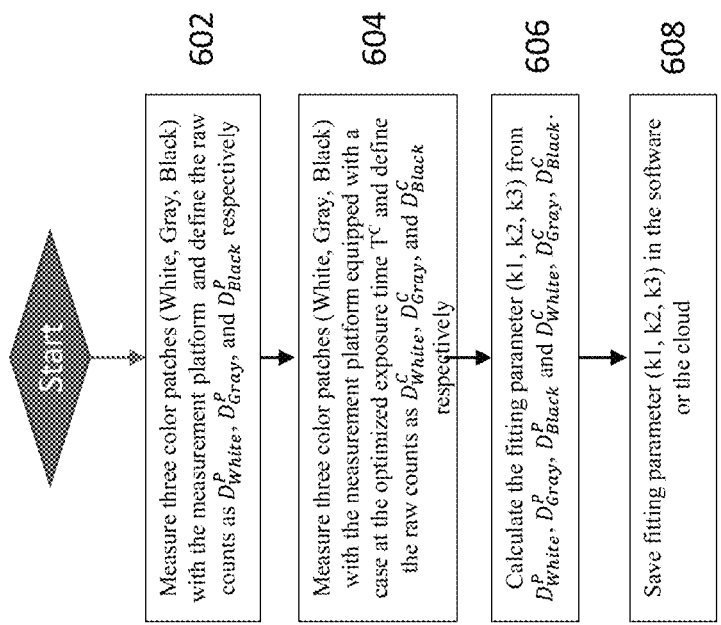
FIG. 6 is a flow diagram detailing the color measurement system according to one implementation described.

In yet a further implementation, as shown in FIG. 6, three (3) calibration color patches are used to obtain the fitting parameters. Here, the same white and black color patches used in steps 502-508 are measured, as well as a third color patch. In a particular implementation, the third color patch is a gray color patch as shown in FIG. 9(*c*). As shown in step 602, the measurement platform 101 is used to measure the three (3) color patching without the case equipped. As shown in step 604, the measurement platform 101 is then configured to measure the three (3) color patches with the case 109 equipped. In each of the measurement steps (602 and 604) the measurement platform 101 generates six (6) vectors (two (2) measurement configurations for each of the three (3) color patches as $\{D_1^P, D_2^P, D_3^P\}$ and $\{D_1^C, D_2^C, D_3^C\}$. Each of the 6 vectors has three elements representing the raw counts from Red, Green, and Blue channels. It will be appreciated that there are multiple ways to generate $2^{nd}$ order polynomial fitting parameters from these six (6) vectors. For example, the parameter generation module 412 configures the processor 104 to generate fitting parameters using the values obtained in steps 602 and 604. For example, step 606 provides that the value for $D^C$ can be adjusted according to:

$$\begin{cases} d_R^{\hat{C}} = k0_R \times (d_R^C)^2 + k1_R \times d_R^C + k2_R \\ d_G^{\hat{C}} = k0_G \times (d_G^C)^2 + k1_G \times d_G^C + k2_G \\ d_B^{\hat{C}} = k0_B \times (d_B^C)^2 + k1_B \times d_B^C + k2_B \end{cases} \quad \text{Eq. 6}$$

Where, $$k0 = \begin{bmatrix} k0_R \\ k0_G \\ k0_B \end{bmatrix}, k1 = \begin{bmatrix} k1_R \\ k1_G \\ k1_B \end{bmatrix} \text{ and } k2 = \begin{bmatrix} k2_R \\ k2_G \\ k2_B \end{bmatrix}$$

are fitting parameters and $$D^{\hat{C}} = \begin{bmatrix} d_R^{\hat{C}} \\ d_G^{\hat{C}} \\ d_B^{\hat{C}} \end{bmatrix}$$

are adjusted raw counts taken by a measurement platform 101 with the case equipped that would match to the raw count $D^P$ of the measurement platform 101 without a case equipped.

Although only 2nd order polynomial fitting with three (3) calibration color patches are discussed, it is natural to conduct higher order polynomial fitting with four (4) or more calibration color patches.

. [HW1]

In a particular implementation, the fitting parameters obtained in steps 602-604 are saved to one or more remote data storage devices as shown in step 608. For example, a storage module 408 configures the processor 104 to store the derived fitting parameters in a local memory location for further use. In another implementation, one or more submodules of the storage module 408 configures the processor 104 to transmit the fitting parameters to a remote storage device, such as a cloud storage location. Such stored fitting parameters can then be accessed for future measurements.

Figure 7:
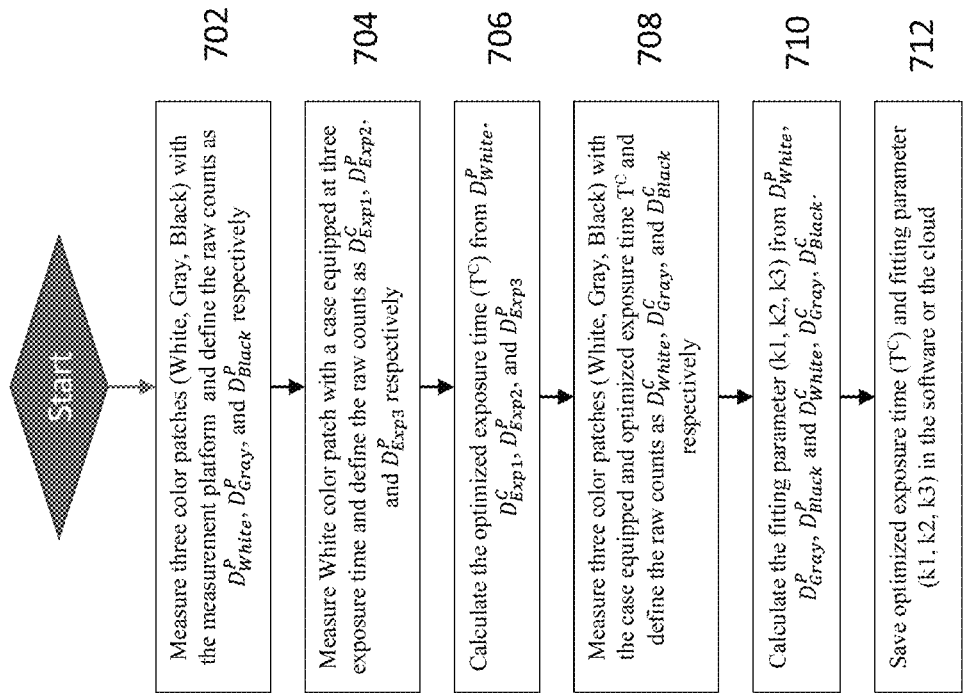
FIG. 7 is a flow diagram detailing the color measurement system according to one implementation described.

As shown in FIG. 7, in one arrangement both the exposure time optimization process and the fitting parameter process can be conducted in a single measurement session. For example, as shown in step 702, a processor 104 of the measurement platform 101 is configured to measure three color patches (White, Gray, Black) without a case equipped and define the raw counts as $D_{White}^P$, $D_{Gray}^P$, and $D_{Black}^P$ respectively. As shown in step 704, a processor 104 of the measurement platform 101 is configured measure the white color patch with the measurement platform 101 without a case equipped at three exposure time and define the raw counts as $D_{Exp1}^C$, $D_{Exp2}^P$, and $D_{Exp3}^P$ respectively. Using these values, the processor 104 is configured to obtain the optimized exposure time ($T^C$) from $D_{White}^P$, $D_{Exp1}^C$, $D_{Exp2}^P$, and $D_{Exp3}^P$ as in step 706. Next, the processor 104 of the measurement platform 101 is configured to measure the same three color patches (White, Gray, Black) with the case equipped at optimized exposure time $T^C$ and define the raw counts as $D_{White}^C$, $D_{Gray}^C$, and $D_{Black}^C$ respectively, as shown in step 708. As shown in step 710, the processor 104 is configured to calculate the fitting parameter (k1, k2, k3) from $D_{White}^P$, $D_{Gray}^P$, $D_{Black}^P$ and $D_{White}^C$, $D_{Gray}^C$, $D_{Black}^C$. The fitting parameters obtained in step 710 and the optimized exposure time obtained in step 706 are then stored to a local or remote data storage location (such as database 108) for further use as in step 712.

Figure 8:
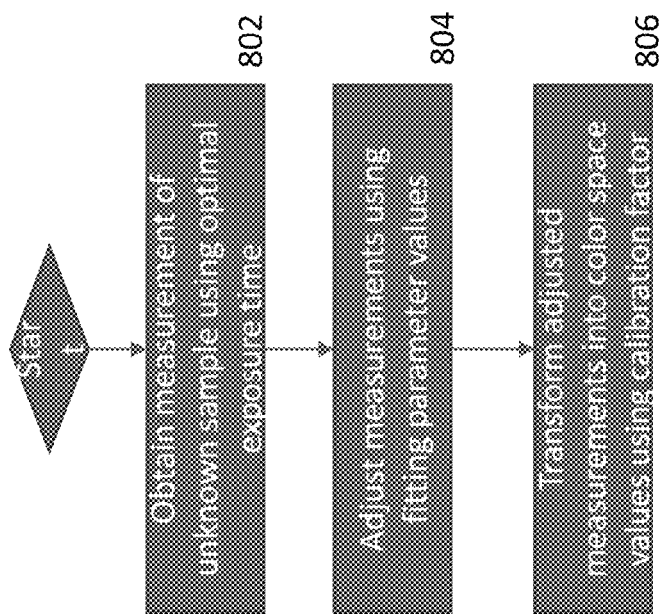
FIG. 8 is a flow diagram detailing the color measurement system according to one implementation described.

Turning now to FIG. 8, a process for acquiring color measurements of an unknown sample is provided. As shown in step 802, a sample under investigation is evaluated by the measurement platform 101 with a case equipped. In one implementation, the measurement platform 101 is configured to acquire a measurement of the unknown sample at the optimal exposure time. As shown in step 804, the processor 104 is configured by one or more measurement modules 416, or submodules thereof, to access the fitting parameters from a local or remote storage device. The processor 104, is further configured by one or more measurement modules 416, to adjust the raw measurements obtained at the optimal exposure time using the fitting parameters as provided in step 804. Using the adjusted raw measurements values, the processor 104 of the measurement platform 101 is configured by one or more measurement modules 416 executing as code therein to generate the corresponding L*a*b* color values using one or more conversion or calibrations functions, as shown in step 806. For example, the adjusted raw counts are combined with a stored color calibration matrix in order to generate the corresponding L*a*b* color space values.

By way of particular example, it will be appreciated that during an initial device calibration, each measurement platform 101 (such as a smartphone) is given a set of calibration parameters that allows the processor 104 thereof to convert the raw counts of a measurement into color values such as L*a*b*. As described in co-pending U.S. patent application Ser. No. 16/591,088, such calibration processes are accomplished by randomly selecting measurement devices each specific model. For example, by selecting a random number of devices from a specific model of smartphone, the calibration process can be simplified using calibration parameters. These calibration parameters, like the adjustment parameters, can be saved to a local or remote data storage device, such as database 108.

For example, one or more submodules of a color matrix module configures a processor to define the adjusted measurement counts as D, where D can be represented by:

$$D = \begin{bmatrix} d_1 \\ d_2 \\ \vdots \\ d_n \end{bmatrix} \quad \text{(Eq. A)}$$

By way of example only, here n is the number of the color sensors utilized by the color measurement device 102 of the measurement platform 101. By way of further example, in a traditional colorimeter or a camera based colorimeter there are usually three discrete color sensors that cover the Red, Green, and Blue channels respectively. Thus, in that specific case, n will equal to 3. However, those possessing an ordinary level of skill in the requisite art will appreciate that other values for n are envisioned and understood.

Using the data values obtained Eq. A, a processor of the measurement platform 101 is further configured by one or more submodules of the measurement module to convert the adjusted sensor measurements into color tristimulus values. For example, the one or more submodules of the of the measurement module configures the processor (such as processor 104) to calculate the color tristimulus values, as defined as RT=[X, Y, Z]$^T$, which can be calculated as $$\begin{bmatrix} X \\ Y \\ Z \end{bmatrix} = M_A \times \begin{bmatrix} D \\ 1 \end{bmatrix} \quad \text{(Eq. B)}$$

Where $M_A$ is a 3×(n+1) color calibration matrix that convert the raw counts (n×1) to the color tristimulus values (3×1). $M_A$ is generated from the color calibration process.

By way of further explanation, in order to derive the value for $M_A$, a set of training colors with known color tristimulus values can be measured by the measurement device without a case equipped. The raw counts (unprocessed measurement outputs) from all the training colors can be combined into a n×m matrix (D), where n is the number of color sensors equipped and m is the number of the training colors.

In order to evaluate the measurements, a 3×m matrix $R_T$ that contains the known color tristimulus values of the m training colors with pre-determined standard illuminant and CIE color match function is also needed. The known color tristimulus values of the m training colors can be obtained by measuring these training colors with a master instrument. In one particular implementation, such a master instrument is the same instrument as the measurement device. However, in alternative implementations, the master instrument is a different make and model from the measurement device. For example, the master instrument used can be a color measurement device having greater precision or fidelity than the color measurement device is capable.

In more detail, the color calibration matrix $M_A$ is generated by estimating the 3×n matrix M and the offset 1×m vector b that map (as closely as possible) the raw count matrix D to the corresponding color tristimulus values matrix RT by:

$$R_T = MD + b. \quad \text{(Eq. C)}$$

Eq. C can be further expressed as a homogeneous equation:

$$R_T = M_A D_A, \quad \text{(Eq. D)}$$

where $M_A$=[M b] is the 3×(n+1) matrix comprising M right-augmented by the column vector b, and $D_A$=[D' 1']' is the (n+1)×m matrix comprising D augmented from the bottom by a row m-vector 1 of 1's. Here, D' is the transpose of D.

In one or more implementations, a color matrix estimation submodule of the color matrix module 414 configures a processor (such as but not limited to processor 104) to estimate $M_A$, using a least-square approximation. For example, as shown in estimation step, the processor 104 is configured to estimate $M_A$ according to:

$$M_A = R_T \text{pinv}(D_A) = R_T D_A'(D_A D_A')^{-1}. \quad \text{(Eq. F)}$$

Once estimation of Eq. F is carried out, the conversion from adjusted counts to the color tristimulus values can be conduct by using Eq. B. The calculated color tristimulus values [X Y Z] can then be further converted to other color spaces, such as Lab and LCH.

Figure 11:
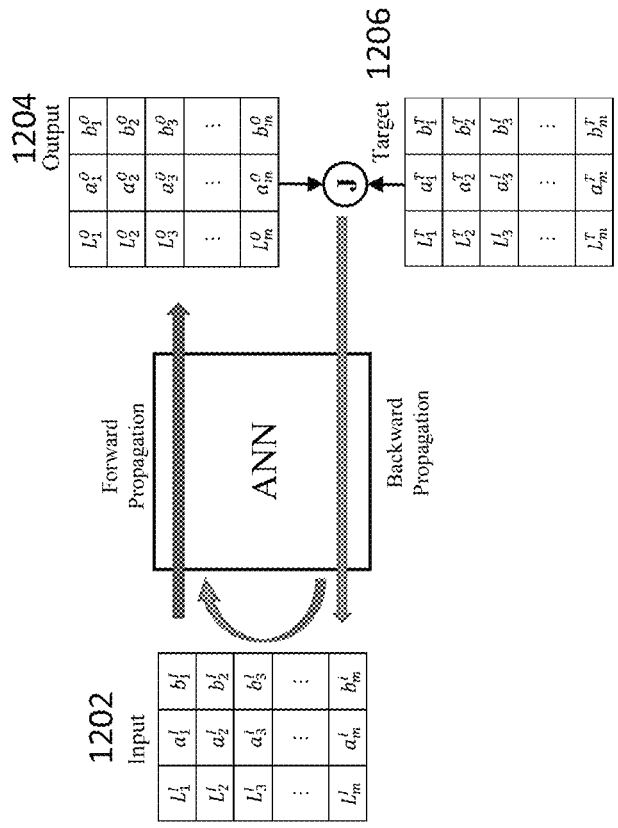
FIG. 11 is illustrates a process of obtaining color measurements for a sample according to one implementation of the color measurement system described.

In an alternative implementation, the processor 104 is configured to use an artificial neural network (ANN) to convert the adjusted raw color measurement values into the desired color space. For example, as shown in FIG. 11, the input table 1202 represents the raw counts from the color sensors equipped in the first color measurement device. As shown, the input table that will be fed into the ANN for training has the dimension of m×n, where m represents the number of training colors while n represents the number of color sensors in the first color measurement device. Each row represents one color measurement, while each column represents raw counts from one specific color sensor. For example, if the NCS color fandeck is used as the training color, m will be equal to 1950. If the first color measurement device is a traditional colorimeter or imaging-based colorimeter, n will be equal to 3.

The ANN will be randomly initiated and forward process the input table to create an output table 1204 $L^Oa^Ob^O$ with dimension of m×3. The cost function J will be calculated as the difference between the output table 1204 and the target table $L^Ta^Tb^T$ 1206 and backward propagates into the ANN to optimize the parameters of the ANN. The forward and backward propagation process is repeated until the minimum of J is located and the optimized parameters are saved. This trained ANN can used to convert the adjusted raw counts from the color measurement platform 101 to the desired color space values (such as L*a*b* values).

While this specification contains many specific embodiment details, these should not be construed as limitations on the scope of any embodiment or of what can be claimed, but rather as descriptions of features that can be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain embodiments, multitasking and parallel processing can be advantageous.

Publications and references to known registered marks representing various systems cited throughout this application are incorporated by reference herein. Citation of any above publications or documents is not intended as an admission that any of the foregoing is pertinent prior art, nor does it constitute any admission as to the contents or date of these publications or documents. All references cited herein are incorporated by reference to the same extent as if each individual publication and references were specifically and individually indicated to be incorporated by reference.

While the invention has been particularly shown and described with reference to a preferred embodiment thereof, it will be understood by those skilled in the art that various changes in form and details may be made therein without departing from the spirit and scope of the invention. As such, the invention is not defined by the discussion that appears above, but rather is defined by the claims that follow, the respective features recited in those claims, and by equivalents of such features.

What is claimed is:

1. A method to calibrate a smartphone equipped with an arbitrary phone case for color lookup applications, the method comprising:
    adjusting an exposure time of a camera of the smartphone with the arbitrary phone case attached so to minimize a difference between one or more color measurements made of at least one color calibration target with the arbitrary phone case attached and one or more color measurements made with the arbitrary phone case not attached; and
    adjusting, using one or more parameters obtained using a nonlinear fitting algorithm, one or more subsequent measurements made by the smartphone with the case attached at the adjusted exposure time.

2. A system obtaining color measurements of a sample, the system comprising:
    a color measurement device; and
    a processor is configured by code executing therein to:
        receive, from the color measurement device provided within a case, one or more color measurements of a sample obtained using an optimized exposure time;
        access one or more adjustment factors from a data storage location, wherein the adjustment factor is derived, in part, from measurements made using the same make of color measurement device; wherein the measurements made using a same make of color measurement were made without a case equipped; and
        adjust the one or more color measurements of the sample obtained by the color measurement device using the adjustment factors to obtain adjusted measurement data;
        transform the adjusted measurement data to color space data.

3. The system of claim 2, wherein the color space data is in L*a*b*, XYZ, LCH, Luv or CIELAB color spaces.

4. The system of claim 2, wherein the color measurement device and processor are provided within the same form factor.

5. The system of claim 4, wherein the form factor is a smartphone or tablet computer.

6. The system of claim 2, wherein the optimized exposure time is derived from at least a calibration measurement of a calibration target with the color measurement device without a case equipped at a pre-determined exposure time and at least three fitting measurements of the calibration target by the color measurement device with the case equipped, wherein at least three of the at least three fitting measurements are obtained at different exposure times than the pre-determined exposure time.

7. The system of claim 6, wherein the exposure times are at least ½, ¼ and ⅛ of the pre-determined exposure time.

8. The system of claim 7, wherein the optimized exposure time is derived using a linear fitting algorithm that uses the calibration measurement and the at least three fitting measurements and is configured to output an exposure time for measurements made by the color measurement device equipped with a case that provide the smallest difference between measurements obtained of the same color by the measurement device without a case equipped and a measurement device with the case equipped.

9. The system of claim 2, wherein the adjustment factors are derived from:
    a first measurement made by the color measurement device without a case equipped of a calibration target with a flash illuminant deactivated;
    a second measurement made by the color measurement device without the case equipped of a calibration target with a flash illuminant activated;
    a third measurement made by the color measurement device, with a case equipped, of a calibration target with a flash illuminant deactivated; and
    a fourth measurement made by the color measurement device, with the case equipped, of a calibration target with a flash illuminant activated.

10. The system of claim 9, wherein the calibration target is white.

11. The system of claim 9, wherein each measurement is obtained at the optimized exposure time.

12. The system of claim 2, wherein the adjustment factors are derived from:
    a first measurement made by the color measurement device without a case equipped of a black calibration target with a flash illuminant activated;
    a second measurement made by the color measurement device without the case equipped of a white calibration target with a flash illuminant activated;
    a third measurement made by the color measurement device, with a case equipped, of a black calibration target with a flash illuminant activated; and
    a fourth measurement made by the color measurement device, with the case equipped, of a white calibration target with a flash illuminant activated.

13. The system of claim 2, wherein the adjustment factors are derived from at least one measurement made by the color measurement device without a case equipped of each of a black, white and grey calibration target; at least one measurement made by the color measurement device with a case equipped of each of the black, white and grey calibration target.

14. The system of claim 13, wherein the measurements of each of the black, white and grey calibration targets used to derive at least second order polynomial fitting parameters that are output at the adjustment factors.

15. The system of claim 2, wherein transforming the adjusted values includes providing the adjusted values as inputs to a pre-trained artificial neural network, the artificial neural network (ANN) having at least an input and an output layer, wherein the output layer is configured to output color values in a pre-determined color space; generating, using the artificial neural network, an output in the predetermined color space values wherein the output corresponds to one or more color values of the sample.

16. The obtaining color measurements of a sample identification system of claim 15, wherein the ANN is trained to output a color space value that is substantially similar to the expected output of a colorimeter when the colorimeter is used to measure the sample.

17. The system of claim 2, wherein the color space data is output to one or more of a display device or database.

18. A method to calibrate a smart phone with an arbitrary phone case for color lookup applications, the method comprising:
    obtaining, with the smartphone without the arbitrary phone case equipped, a first measurement data set that includes at least one measurement of each of a black, white and grey calibration target;
    obtaining, with the smartphone with the arbitrary phone case equipped, at least three exposure measurements of a white calibration target at least three different exposure times;
    calculating an optimized exposure time using at least the at least three exposure measurements;
    obtaining, with the smartphone with the arbitrary phone case equipped, a second measurement data set that includes at least one measurement of each of a black, white and grey calibration target at the optimized exposure time;
    generating fitting parameters from the first and second measurement datasets; and
    storing the generated fitting parameters and optimized exposure time in at least one of a local or remote data storage device.

* * * * *